US010036508B2

(12) United States Patent
Bordne et al.

(10) Patent No.: US 10,036,508 B2
(45) Date of Patent: Jul. 31, 2018

(54) FLOW VORTEX SPOILER (71) Applicant: GENERAL ELECTRIC COMPANY, Schenectady, NY (US)

(72) Inventors: Christopher Mark Bordne, Marblehead, MA (US); James Luz, Tewksbury, MA (US); Thomas Charles McCarthy, Cincinnati, OH (US); Andrew Courtenay Fenn, Peabody, MA (US)

(73) Assignee: General Electric Company, Schenectady, OH (US)

( * ) Notice: Subject to any disclaimer, the term of this patent is extended or adjusted under 35 U.S.C. 154(b) by 46 days.

(21) Appl. No.: 14/912,319

(22) PCT Filed: Aug. 5, 2014

(86) PCT No.: PCT/US2014/049682
§ 371 (c)(1),
(2) Date: Feb. 16, 2016

(87) PCT Pub. No.: WO2015/023471
PCT Pub. Date: Feb. 19, 2015

(65) Prior Publication Data
US 2016/0201848 A1 Jul. 14, 2016

Related U.S. Application Data (60) Provisional application No. 61/866,713, filed on Aug. 16, 2013.

(51) Int. Cl.
*F15C 1/16* (2006.01)
*F16N 1/00* (2006.01)
(Continued)

(52) U.S. Cl.
CPC ............... *F16N 1/00* (2013.01); *F01D 11/04* (2013.01); *F01D 25/18* (2013.01); *F02C 7/06* (2013.01);
(Continued)

(58) Field of Classification Search
CPC ...... F16N 1/00; F02C 7/06; F02C 7/28; F01D 25/18; F01D 11/04; F05D 2220/32; F05D 2260/98; F05D 2240/55; F05D 2240/50
(Continued)

(56) References Cited

U.S. PATENT DOCUMENTS 2,541,850 A 2/1951 Wade
4,190,397 A 2/1980 Schilling et al.
(Continued)

FOREIGN PATENT DOCUMENTS

CN 1421594 A 6/2003
CN 1582363 A 2/2005
(Continued)

OTHER PUBLICATIONS

Unofficial English Translation of Chinese Office Action issued in connection with corresponding CN Application No. 201480045535.9 dated Jul. 4, 2016.
(Continued)

*Primary Examiner* — Minh Le
(74) *Attorney, Agent, or Firm* — General Electric Company; Pamela Kachur (57) ABSTRACT

A flow vortex spoiler including an oil sump wherein pressurization air flow moves about the oil sump through a sump pressurization cavity, the cavity having an inlet, a circumferential plate disposed across a portion of the pressurization cavity near the inlet. The circumferential plate is disposed at said inlet to said sump pressurization cavity. The circumferential plate has a plurality of closely spaced apertures.

(Continued)

The pressurization air has a radial component and a tangential component wherein the circumferential plate and the plurality of closely spaced apertures substantially reduce the tangential component of the pressurization air and further wherein the vortex spoiler inhibits excessive pressure change within the pressurization cavity and inhibits oil leakage at seals adjacent to the oil sump.

19 Claims, 5 Drawing Sheets (51) Int. Cl.
*F01D 25/18* (2006.01)
*F01D 11/04* (2006.01)
*F02C 7/06* (2006.01)
*F02C 7/28* (2006.01)

(52) U.S. Cl.
CPC ............ *F02C 7/28* (2013.01); *F05D 2220/32* (2013.01); *F05D 2240/50* (2013.01); *F05D 2240/55* (2013.01); *F05D 2260/98* (2013.01)

(58) Field of Classification Search
USPC ........................................................ 137/808
See application file for complete search history.

(56) References Cited

U.S. PATENT DOCUMENTS

| | | | |
|---|---|---|---|
| 4,541,774 A | 9/1985 | Rieck et al. | |
| 4,561,246 A * | 12/1985 | Hovan | F01D 25/125 165/51 |
| 4,574,584 A | 3/1986 | Hovan | |
| 5,090,865 A | 2/1992 | Ramachandran et al. | |
| 5,619,850 A * | 4/1997 | Palmer | F01D 11/04 60/39.83 |
| 5,997,244 A | 12/1999 | Gebre-Giorgis et al. | |
| 6,398,487 B1 | 6/2002 | Wallace et al. | |
| 6,513,335 B2 * | 2/2003 | Fukutani | F01D 11/04 415/176 |
| 7,065,954 B2 * | 6/2006 | Labala | F01D 25/18 184/11.2 |
| 7,287,384 B2 * | 10/2007 | Fish | F01D 25/183 415/111 |
| 7,682,131 B2 * | 3/2010 | Legare | F01D 5/088 415/208.2 |
| 7,708,519 B2 | 5/2010 | Mignano | |
| 7,828,513 B2 * | 11/2010 | Durocher | F01D 11/001 415/111 |
| 7,935,164 B2 * | 5/2011 | Fang | B01D 45/14 55/385.3 |
| 8,453,465 B2 * | 6/2013 | Baldaccini | F01D 25/125 415/115 |
| 2003/0097872 A1 | 5/2003 | Granitz et al. | |
| 2004/0247429 A1 | 12/2004 | Arilla et al. | |
| 2005/0132710 A1 | 6/2005 | Peters et al. | |
| 2006/0123795 A1 | 6/2006 | Fish et al. | |
| 2016/0017812 A1 * | 1/2016 | Sheridan | F02C 7/36 415/1 |

FOREIGN PATENT DOCUMENTS

| | | |
|---|---|---|
| GB | 2152148 A | 7/1985 |
| JP | 2005180427 A | 7/2005 |

OTHER PUBLICATIONS

International Search Report and Written Opinion dated Nov. 28, 2014 which was issued in connection with PCT Patent Application No. PCT/US14/049682 which was filed on Aug. 5, 2014.

* cited by examiner

FLOW VORTEX SPOILER

CROSS-REFERENCE TO RELATED APPLICATIONS

This application is a national stage application under 35 U.S.C. § 371(c) of prior filed, PCT application serial number PCT/US2014/049682, filed on Aug. 5, 2014, which claims priority to U.S. Patent Application Ser. No. 61/866,713, titled "Flow Vortex Spoiler" filed Aug. 16, 2013. The above-listed applications are herein incorporated by reference.

BACKGROUND

Field of the Invention

Present embodiments relate generally to apparatuses and methods, for mitigating vortex swirl in a turbine engine. More specifically, but not by way of limitation, present embodiments relate to a flow vortex spoiler which mitigates vortex swirl in a sump pressurization cavity extending about an oil sump within a turbine engine.

Description of the Related Art

In a gas turbine engine, air is pressurized in a compressor and mixed with fuel in a combustor for generating hot combustion gases which flow downstream through one or more turbine stages. These turbine stages extract energy from the combustion gases. A high pressure turbine includes a first stage stator nozzle and a rotor assembly including a disk and a plurality of turbine blades. The high pressure turbine first receives the hot combustion gases from the combustor and includes a first stage stator nozzle that directs the combustion gases downstream through a row of high pressure turbine rotor blades extending radially outwardly from a first rotor disk. In a two stage turbine, a second stage stator nozzle is positioned downstream of the first stage blades followed in turn by a row of second stage turbine blades extending radially outwardly from a second rotor disk. The stator nozzles turn the hot combustion gas in a manner to maximize extraction at the adjacent downstream turbine blades.

The first and second rotor disks are joined to the high pressure compressor by a corresponding high pressure shaft for powering the compressor during operation. The nozzles include static air foils, commonly referred to as vanes, interspaced in the engine axial direction between rotating blades. A multi-stage low pressure turbine follows the multi-stage high pressure turbine and is typically joined by a second low pressure shaft to a fan disposed upstream from the compressor. The second low pressure shaft may be coupled with the first high pressure shaft.

As the combustion gasses flow downstream through the turbine stages, energy is extracted therefrom and the pressure of the combustion gas is reduced. The combustion gas is used to power the compressor as well as a turbine output shaft for power and marine use or provide thrust in aviation usage. In this manner, fuel energy is converted to mechanical energy of the rotating shafts to power the compressor and supply compressed air needed to continue the process.

It is desirable in the operation of turbine engines to minimize or eliminate vortex swirl of air moving in the engine, in certain instances. The air can have various vector components which make up flow depending on location within the engine. For example, air which moves in a radial direction may also have a tangential component due to the rotation of components within the engine. This tangential component results in a vortex or swirl. In an otherwise non-swirling fluid flow, the creation of these vortices can create significant pressure drop or pressure rise which is highly undesirable.

In the context of oil sumps, minimum pressure differential is utilized to prevent oil leakage from inside to outside the sump. For example, pressurization air moving about a sump may place pressure on an outside of a seal and inhibit oil leakage from inside the sump across the seal. When pressure differential around a sump is too high, i.e. pressure drops or rises too much so that pressure at the outside one of the seals is too low relative to the pressure at the outside of the other seal or seals, oil leakage prevention characteristics of the seal may be compromised. As utilized in the present disclosure, "pressure differential around a sump" refers to the maximum difference in air pressure on the dry side of all oil seals for an individual sump. Therefore, the vortices of the pressurization air moving about the sump may negatively impact the ability to maintain a desirable pressure differential around the sump.

As may be seen by the foregoing, there is a need for limiting the amount of pressure differential around an oil sump. Additionally, there is a need to limit the effect of a vortex in a flow path which may lead to an undesirable pressure change and problems associated therewith.

The information included in this Background section of the specification, including any references cited herein and any description or discussion thereof, is included for technical reference purposes only and is not to be regarded subject matter by which the scope of the invention is to be bound.

SUMMARY OF THE INVENTION

The present embodiments relate to an oil sump and the inhibition of pressure rise upstream of an oil seal due to vortex carryover. Pressurization air flow is directed through a flow vortex spoiler to decrease the amount of vortex swirl by substantially reducing, if not eliminating, the tangential component of the vortex flow. The vortex spoiler is generally a circumferential plate having a plurality of spaced apart apertures located in a spaced arrangement. As pressurization air passes through each aperture, the tangential component of the flow impinges upon the aperture wall, thereby dissipating the tangential component of the flow and resulting in a more solely radial flow direction. Additionally, excessive pressure loss is also controlled through characteristics of the vortex spoiler.

According to some embodiments, a flow vortex spoiler comprising an oil sump wherein pressurization air flows about the oil sump through a sump pressurization cavity, the cavity having an inlet, a circumferential plate disposed across a portion of the pressurization cavity near the inlet. The circumferential plate is disposed at an inlet to the sump pressurization cavity. The circumferential plate has a plurality of closely spaced apertures. The pressurization air has a radial component and a tangential component wherein the circumferential plate and the plurality of closely spaced apertures substantially reduce the tangential component of the pressurization air and further wherein the vortex spoiler inhibits excessive pressure change within the pressurization cavity and inhibits oil leakage at forward and aft sump seals adjacent to the oil sump at the first location and the second location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. All of the above outlined features are to be understood as exemplary only and many more features and objectives of the invention may be gleaned from the disclosure herein. Therefore, no limiting interpretation of this summary is to be understood without further reading of the entire specification, claims, and drawings included herewith. A more extensive presentation of features, details, utilities, and advantages of the present invention is provided in the following written description of various embodiments of the invention, illustrated in the accompanying drawings, and defined in the appended claims.

BRIEF DESCRIPTION OF THE DRAWINGS

The above-mentioned and other features and advantages of this invention, and the manner of attaining them, will become more apparent and the flow vortex spoiler will be better understood by reference to the following description of embodiments taken in conjunction with the accompanying drawings, wherein.

DETAILED DESCRIPTION

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended that the present invention covers such modifications and variations as come within the scope of the appended claims and their equivalents.

As used herein, and unless otherwise referenced relative to another part, the terms "axial" or "axially" refer to a dimension along a longitudinal axis of an engine. The term "forward" used in conjunction with "axial" or "axially" refers to moving in a direction parallel to the engine axis closer to the engine inlet. The term "aft" used in conjunction with "axial" or "axially" refers to moving in a direction parallel to the engine axis and closer to the engine outlet. As used herein, the terms "radial" or "radially" refer to a dimension extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, tangential, circumferential) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring now to FIGS. 1-6, the various embodiments depict apparatuses and methods of a flow vortex spoiler maintaining minimal pressure differential across an oil sump. The present embodiments apply to a gas turbine engine, for example aviation, power generation, industrial or marine applications, in which a combustor burns fuel and discharges hot combustion gas into a high pressure turbine. The instant structures and methods aid to balance pressure across an oil sump for a high speed turbine shaft and more specifically, limit pressure rise due to vortex carryover of air upstream of an oil seal for the oil sump while also inhibiting significant pressure loss. The present disclosure is applicable to vented as well as non-vented oil sump configurations. The specific embodiments shown in the figures decrease vortex swirl within the sump pressurization cavity which otherwise increase static pressure on one of the sump seals relative to the other seal. As a result, oil leakage at oil seals is decreased.

Figure 1:
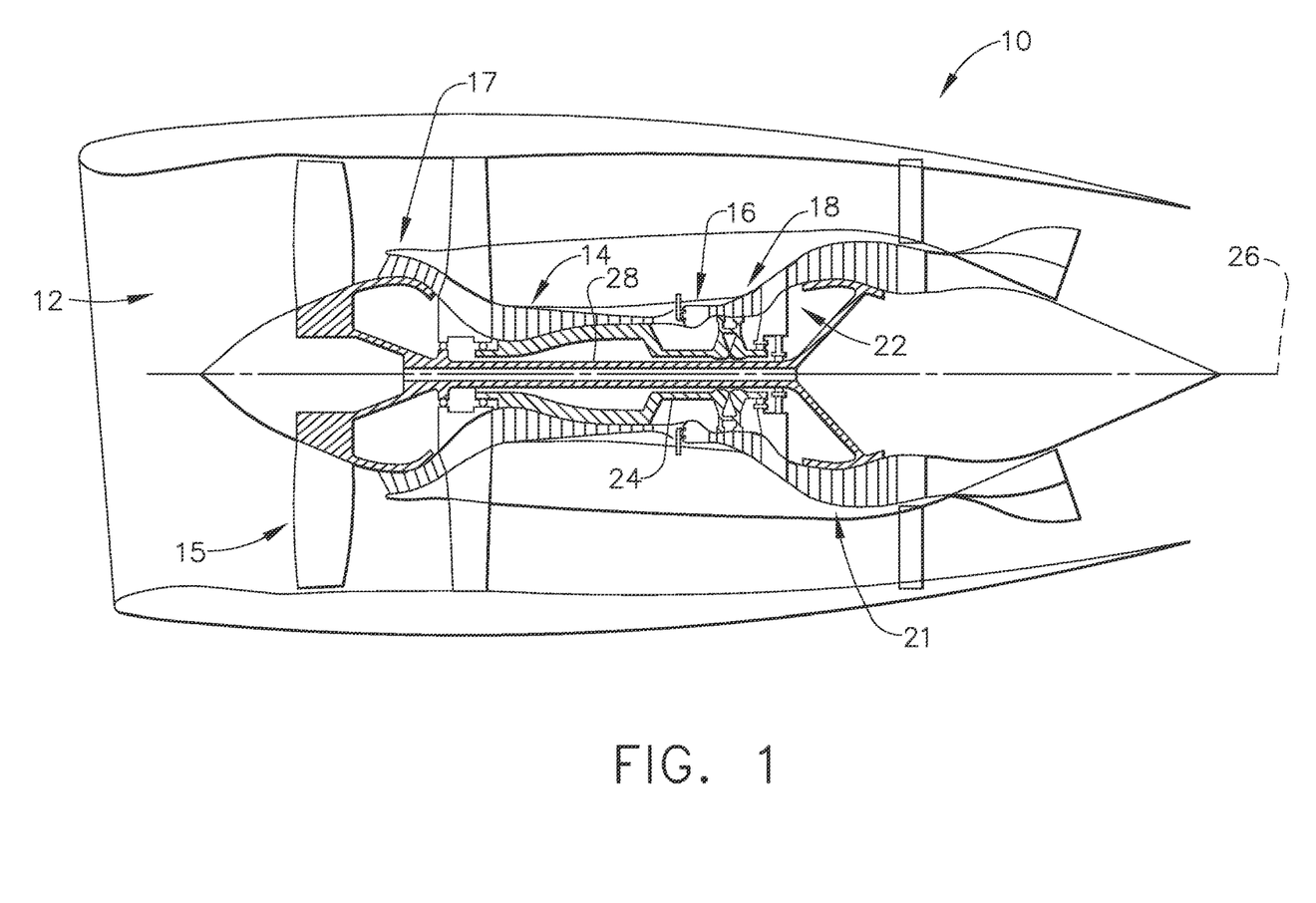
FIG. 1 is a section view of a gas turbine engine.

Referring initially to FIG. 1, a schematic side section view of a gas turbine engine 10 is shown having an engine inlet end 12, a high pressure compressor 14, a combustor 16 and a multi-stage high pressure turbine 18. The gas turbine engine 10 may be used for aviation, power generation, industrial, marine or the like. The gas turbine engine 10 is axisymmetrical about an engine axis 26 so that the components rotate thereabout. Depending on the usage, the engine inlet end 12 may be a fan 15 followed by a low pressure compressor 17 and a high pressure compressor 14. In operation air enters through the engine inlet end 12 of the gas turbine engine 10 and moves through at least one stage of compression where the air pressure is increased and directed to the combustor 16. The compressed air is mixed with fuel and burned providing the hot combustion gas which exits toward the high pressure turbine 18. At the high pressure turbine 18, energy is extracted from the hot combustion gas causing rotation of turbine blades and a high pressure turbine shaft 24. The high pressure turbine shaft 24 passes toward the front of the gas turbine engine 10 to cause rotation of the high pressure compressor 14.

A second, low pressure turbine shaft 28 is connected to the low pressure turbine 21, passes through the hollow high pressure turbine shaft 24 and may rotate independently of the high pressure turbine shaft 24. The low pressure turbine shaft 28 extends from the low pressure turbine 21 to the low pressure compressor 17 and drives the operation of that component of the gas turbine engine 10. The axisymmetrical shafts 24, 28 extends through the through the gas turbine engine 10, between the forward end and the aft end and are supported by bearings along the length of the shaft structures. During operation the shafts 24, 28 rotate along with other structures connected to the shafts such as the rotor assemblies of the turbine 18, 21 in order to create power for various types of gas turbine engines used in power and industrial or aviation fields.

The bearings operate in oil sumps to cool parts during the high speed revolution. Fluid leakage in and around rotating parts may significantly increase fuel consumption, reduce engine efficiency and result in other undesirable operating parameters for the gas turbine engine 10. Additionally, high pressure gases, such as combustion gases within the turbine and compressor discharge area, may leak from high pressure areas to low pressure areas and controlling such leakage is beneficial. Control or inhibition of such leakage is performed in a variety of manners including, for example, labyrinth seals and brush seals positioned between areas of differential pressure. Over time, however, increased exposure to these high pressure and thermal areas may result in loss of seal effectiveness.

In gas turbine engines it is frequently necessary or desirable to isolate a volume, which may include one or more rotating parts in order to confine a fluid, such as oil, and to prevent such fluid from flowing into adjacent areas or flowing out of the volume. For example, in a gas turbine engine, it may be necessary to confine a liquid lubricant associated with shaft bearings to the volume, for example sump, surrounding the bearing in order to prevent amounts of the fluid or oil from leaking from the sump. In oil sump structures, pressurized air is utilized to pass around or through the sump area in order to pressurize seals and inhibit leakage as well as cool oil or operating components.

Vented and non-vented oil sumps having a plurality of oil seals comprising labyrinth type, carbon type, or other types rely on a minimal pressure differential around the sump and between the oil seals to inhibit leakage. When pressure differential around a sump is too high, where, as defined previously, "pressure differential around a sump" refers to maximum difference in air pressure on the dry side of all oil seals for an individual sump, seals may not function appropriately, which is undesirable.

Figure 2:
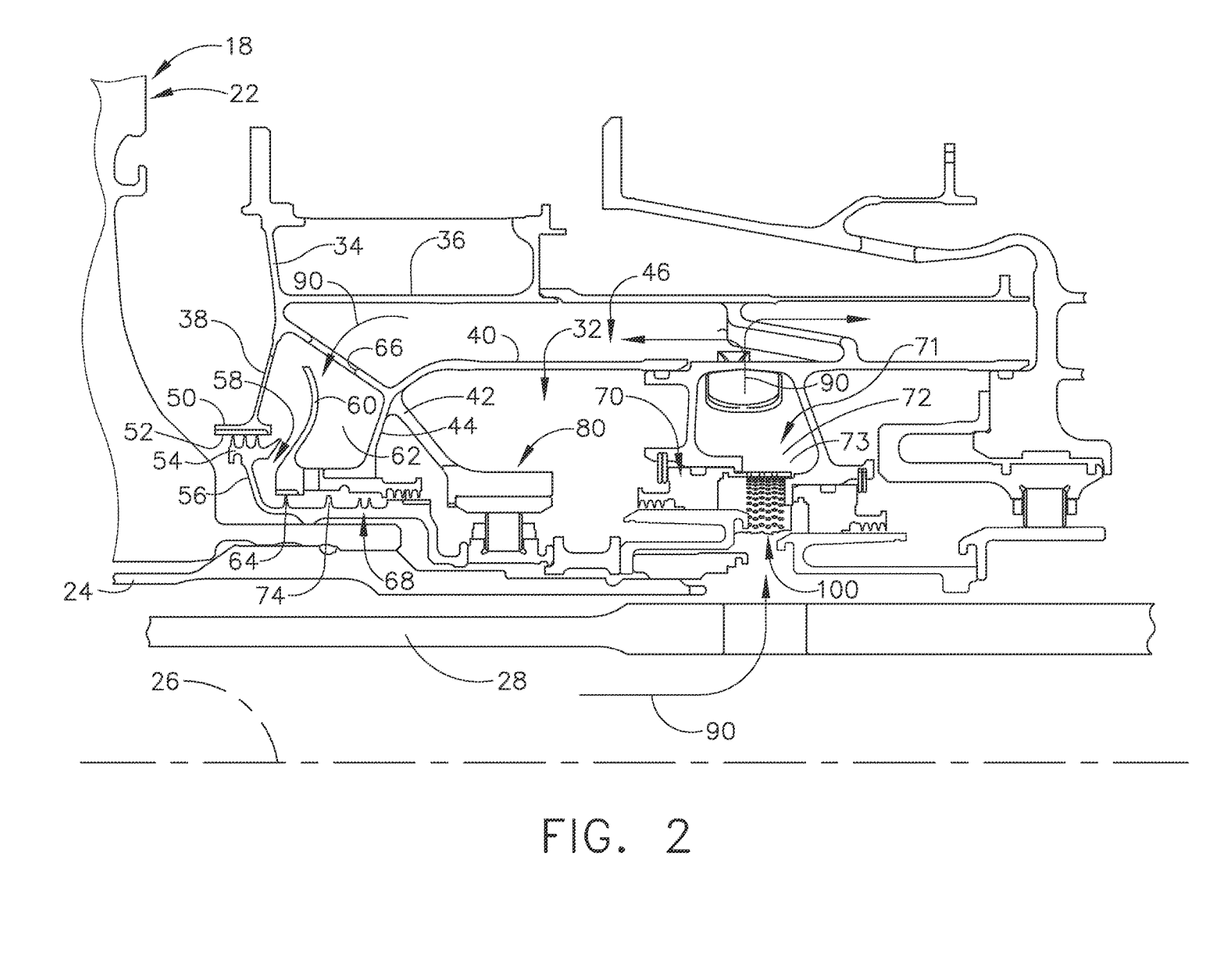
FIG. 2 is a side view of oil sumps within a turbine and a pressurization cavity.

Referring now to FIG. 2, a side view of an exemplary oil sump 32 is shown. In the aft area of the gas turbine engine 10, one or more sumps may be located which service bearings providing for rotation of a radially inner or low pressure turbine shaft 28 and a radially outer shaft or high pressure turbine shaft 24. The high pressure turbine shaft 24 interconnects the high pressure turbine 18 and high pressure compressor 14 (FIG. 1) while the inner low pressure shaft 28 interconnects the low pressure compressor 17 (FIG. 1) and low pressure turbine 21 (FIG. 1). During operation of the gas turbine engine 10, both shafts 24, 28 will rotate at different speeds relative to each other. Further, both shafts 24, 28 may rotate in the same direction or in opposite directions.

At the left-hand side of the Figure, a high pressure turbine 18 is represented by a rotor assembly 22 which is connected to the high pressure turbine shaft 24 extending about and rotating about the center line engine axis 26 as well. Also depicted radially below the high pressure turbine shaft 24 is the low pressure turbine shaft 28 which also rotates about the engine axis 26.

Axially aft of the rotor assembly 22 is an oil sump housing, which is defined by a plurality of structural members 34, 36, 38, 40, 42, 44 and 66. These members generally define the oil sump 32 wherein a volume of oil is housed and a sump pressurization cavity 71 comprising pressurization flow paths 72, 46 and 62. Pressurization flow paths 72, 46, and 62 represent a path for the pressurization air flow 90 around the oil sump 32. In the depicted embodiment, the oil sump 32 is positioned above the high pressure turbine shaft 24 and oil is retained within the oil sump 32 for cooling and lubrication of at least one shaft bearing assembly 80. Extending about the oil sump 32 is a sump pressurization cavity 71 which is defined by pressurization flow paths 72, 46 and 62 that surround the oil sump 32 and through which pressurization air flow 90 is supplied to the sump seals 68, 70. Depending from structural member 38 is a sump forward air seal land 50 having a rub strip 52 located along a lower surface thereof. Beneath the sump forward air seal land 50 and engaging the rub strip 52 is a sump forward air labyrinth seal 54. Labyrinth seal 54 includes a plurality of seal teeth which extend radially upwardly to engage the rub strip 52 to create a seal. Axially aft of the labyrinth seal 54 and extending radially inwardly along an arm 56 is a lower pressure pathway 58.

Moving axially aft from the windage shield 60 is a bypass pressurization flow path 62. Beneath the windage shield 60 is a single tooth seal or a pressurization tooth 64. The pressurization tooth 64 forms a seal with the lower pressure pathway 58 and inhibits air in the lower pressure pathway 58, wherein a forced vortex is created, from decreasing the pressure on the aft side of the pressurization tooth 64. Aft of pressurization tooth 64 is a sump seal 68, for example a labyrinth seal, which defines a forward seal for the oil sump 32. The aft sump seal 70, for example a carbon seal, defines the opposite seal for the oil sump 32. Within the oil sump 32 is a bearing assembly 80, for example a roller bearing assembly.

The pressurization tooth 64 limits the pressure drop associated with the vortex on the forward side of the windage shield 60 from affecting pressure on the aft side of the pressurization tooth 64. This results in more controlled pressure loss downstream of pressurization flow path 62 as the pressurization air flow 90 moves near the rotating labyrinth seal 54 and arm 56.

A vortex of air will exhibit a higher pressure at the outer radius of the vortex than the inner radius, therefore a flow of air will experience a pressure rise if it flows through a vortex from a smaller radius to a larger radius, or it will experience a pressure drop if it flows through a vortex from a larger radius to a smaller radius.

As shown in the figure, pressurization air flow 90 moves radially upwardly into the sump pressurization cavity 71 at the pressurization flow path 72 aft of the oil sump 32. The pressurization air flow 90 moves upwardly through the pressurization flow path 72 and through an aperture in the structural member 40 and for purpose of this description turns forward relative to the axial direction of the gas turbine engine 10, through pressurization flow path 46. At the structural member 42 the pressurization air flow 90 passes through a structural member 66 and moves downwardly through the bypass pressurization flow path 62 extending along the aft side of the windage shield 60. As a result, the vortex created by rotation in the lower pressure pathway 58 is substantially separated by the windage shield 60 from the pressurization air flow 90 moving through the bypass pressurization flow path 62.

As shown in the figure, it is desirable that the pressure adjacent to aft sump seal 70 and the pressure at the forward sump seal 68 be close to equal or that the pressure of the forward sump seal 68 be very slightly lower than the pressure at the aft sump seal 70. The pressurization air flow 90 moving in the aft direction at the forward sump seal 68 creates a barrier to oil from moving out of the oil sump 32 in the aft-to-forward direction. Adjacent to the forward sump seal 68 is a discourager tooth seal 74. This provides two functions. First, the forward sump seal 68 inhibits oil leakage from the aft-to-forward direction. Second, the forward sump seal 68 provides an impulse of high velocity air above the tip of the discourager tooth seal 74 further inhibiting oil from leaking forward of the forward sump seal 68. When the pressure at the pressurization flow path 72 increases, as was the case due to vortex carryover before the implementation of the instant vortex spoiler 100, this could cause the pressure at the downstream seals 74, 68 to be higher than the pressure at the upstream aft sump seal 70, which could result in oil from the oil sump 32 leaking across the aft sump seal 70. Therefore, a goal of the instant embodiment is to minimize pressure differential across the sump 32, and ensure that the pressure at aft sump seal 70 is slightly greater than at the forward sump seal 68, thereby ensuring proper seal performance and inhibiting leakage from the oil sump 32 across the seals 68, 70.

With reference still to FIG. 2, as pressurization air flow 90 moves radially from the low pressure turbine shaft area 28 into the sump pressurization cavity 71, the pressurization air flow 90 is depicted moving through the low pressure turbine shaft 28 and aft of the high pressure turbine shaft 24 in a radial direction about the oil sump 32. Due to the flow through the low pressure turbine shaft 28 and friction from high speed rotation of the components attached to the high pressure turbine shaft 24, the pressurization air flow 90 has both a radial component of velocity and a tangential component of velocity. Specifically at lower speeds, such as idle speed, but also at higher speeds as well, the tangential component causes a vortex, or swirl, within the sump pressurization cavity 71 through which the pressurization air flow 90 passes about the oil sump 32. Such vortex causes an increase or rise of pressure of the pressurization air flow 90 and such pressure increase can be more problematic at lower engine speeds, such as for example idle speeds. With excessive pressure rise in the sump pressurization cavity 71, the result of such increase may be seen in the area of the seals 68, 74. If the pressure on these seals 68, 74 acting in the forward-to-aft axial direction of the depicted embodiment, becomes higher than the pressure at the aft sump seal 70, pressure within the oil sump 32 may cause oil to leak from within the oil sump 32 in the forward-to-aft axial direction across aft sump seal 70, which is highly undesirable. Therefore, it is desirable to reduce this pressure rise in the sump pressurization cavity 71 so as to inhibit reversal of pressurization of the aft sump seal 70 and inhibit oil leakage across the aft sump seal 70, in a forward-to-aft direction, according to the depicted embodiment. Additionally, according to the depicted embodiment, the reduction in vortex pressure rise is not excessively restricted so as to result in pressure on seals 68, 74 to be too low relative to pressure on aft sump seal 70. In this scenario, pressure within the sump 32 may cause oil to leak from within the sump 32 in the aft-to-forward direction across forward sump seal 68.

The internal pressure of a non-vented sump is essentially equal to the pressure seen by the forward sump seal 68 because of the extremely low flow, and therefore low pressure drop, across the forward sump seal 68. Appropriate pressure is maintained at the forward sump seal 68 to inhibit oil from oil sump 32 from moving forward through the forward sump seal 68 and leaking, and to keep the pressure inside the oil sump 32 from becoming higher than the pressure seen by the aft sump seal 70 on the aft side of the sump and prevent oil from leaking forward-to-aft across this aft sump seal 70.

In order to reduce pressure rise around the oil sump 32 due to vortices in the pressurization air flow 90, a vortex spoiler 100 is positioned near an inlet 73 to the sump pressurization cavity 71. The vortex spoiler 100 serves at least two functions. First, excessive pressure rise is inhibited by reducing vortex carryover moving through the sump pressurization cavity 71. Second, the vortex spoiler 100 also serves to inhibit excessive pressure loss downstream of aft sump seal 70 by incorporating sufficient total flow area through the plurality of apertures in the vortex spoiler 100. It may be desirable that the total flow of pressurization air flow 90 does not create a substantial pressure drop across the vortex spoiler 100. Thus, pressure loss is minimized for a given flow rate. In terms of spoiler architecture, maximizing apertures 104 provided very little pressure drop and maximized flow through the vortex spoiler 100. The vortex spoiler 100 extends circumferentially about the engine axis 26 and eliminates, or substantially reduces, the tangential component of the pressurization air flow 90 moving into the sump pressurization cavity 71 so that vortex flow is minimized and pressure rise is reduced at the forward end of the sump toward the seals 74, 68. The vortex spoiler 100 generally is defined by circumferential plate 101 (FIG. 3) having a first surface 102 (FIG. 3) and a second surface 103 (FIG. 4) and a plurality of apertures 104 (FIG. 3) arranged in a spaced pattern between the surfaces, 102, 103. The high number of apertures 104 generally defines a screen with certain characteristics that decrease the tangential flow of air while allowing flow in the radial direction without high pressure loss. This vortex spoiler 100 decreases the tangential component of the pressurization air flow 90 and reduces vortex or swirl within the sump pressurization cavity 71. The vortex spoiler 100 could be used effectively to decrease the tangential flow of air whether the radial component of flow is in either an outward or inward direction.

Figure 3:
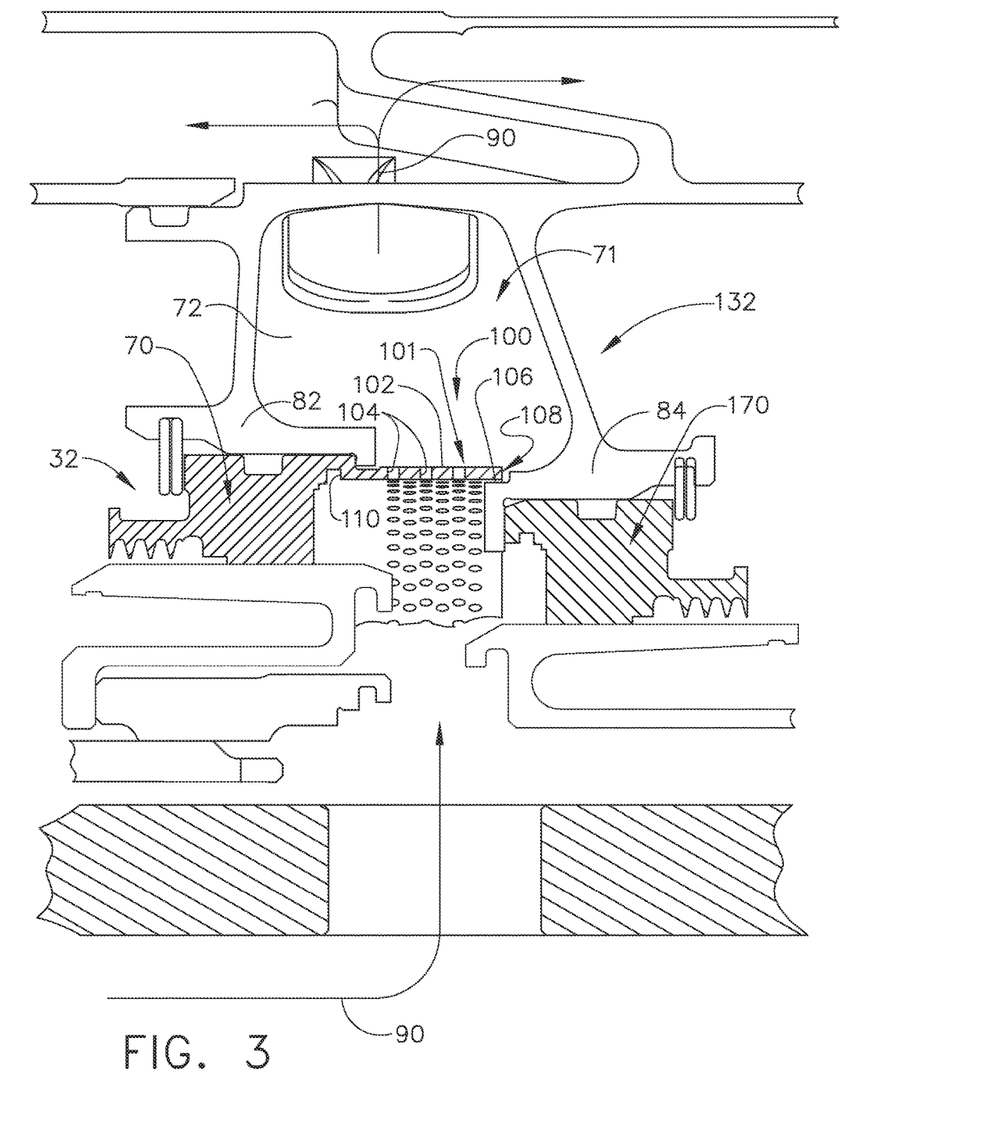
FIG. 3 is a detailed side section view of the inlet area of the pressurization cavity including an exemplary flow vortex spoiler.

Referring now to FIG. 3, a detailed side section view of the inlet to the sump pressurization cavity 71 is depicted, including the flow vortex spoiler 100. The pressurization air flow 90 moves radially between oil sump 32 and a second oil sump 132, which is positioned aft of the forward oil sump 32. Located across the radial pressurization air flow path 90 is the vortex spoiler 100, which is defined by surface 102 having a plurality of apertures 104. As the pressurization air flow 90 moves in a radial direction, the tangential component of the flow, which causes vortex or swirl, is removed by causing such pressurization air flow 90 to engage the sidewalls of the apertures 104. Once the pressurization air flow 90 passes through the vortex spoiler 100, the flow continues in a radial direction before turning in either or both of the forward and aft directions. The vortex spoiler 100 is circular in cross-section and extends in an axial direction wherein the surface 102 of the vortex spoiler 100 is generally parallel to the engine axis 26 (FIG. 2).

To the forward and aft of the vortex spoiler 100 are carbon seal mounting structures 82, 84. Positioned below mounting structures 82, 84 are aft sump seals 70, 170. The vortex spoiler 100 may be integrated to one or both of the aft sump seals 70, 170 as depicted but this is not limiting and therefore is not considered a necessity. However, for example, manufacturing costs or processes may be improved by integrating the vortex spoiler 100 with one or more adjacent components.

The vortex spoiler 100 functions to not allow flow to pass through the apertures 104 without engaging the sidewalls defining the apertures 104. The tangential component of the pressurization air flow 90 is reduced with minimal pressure drop across the vortex spoiler 100.

Figure 4:
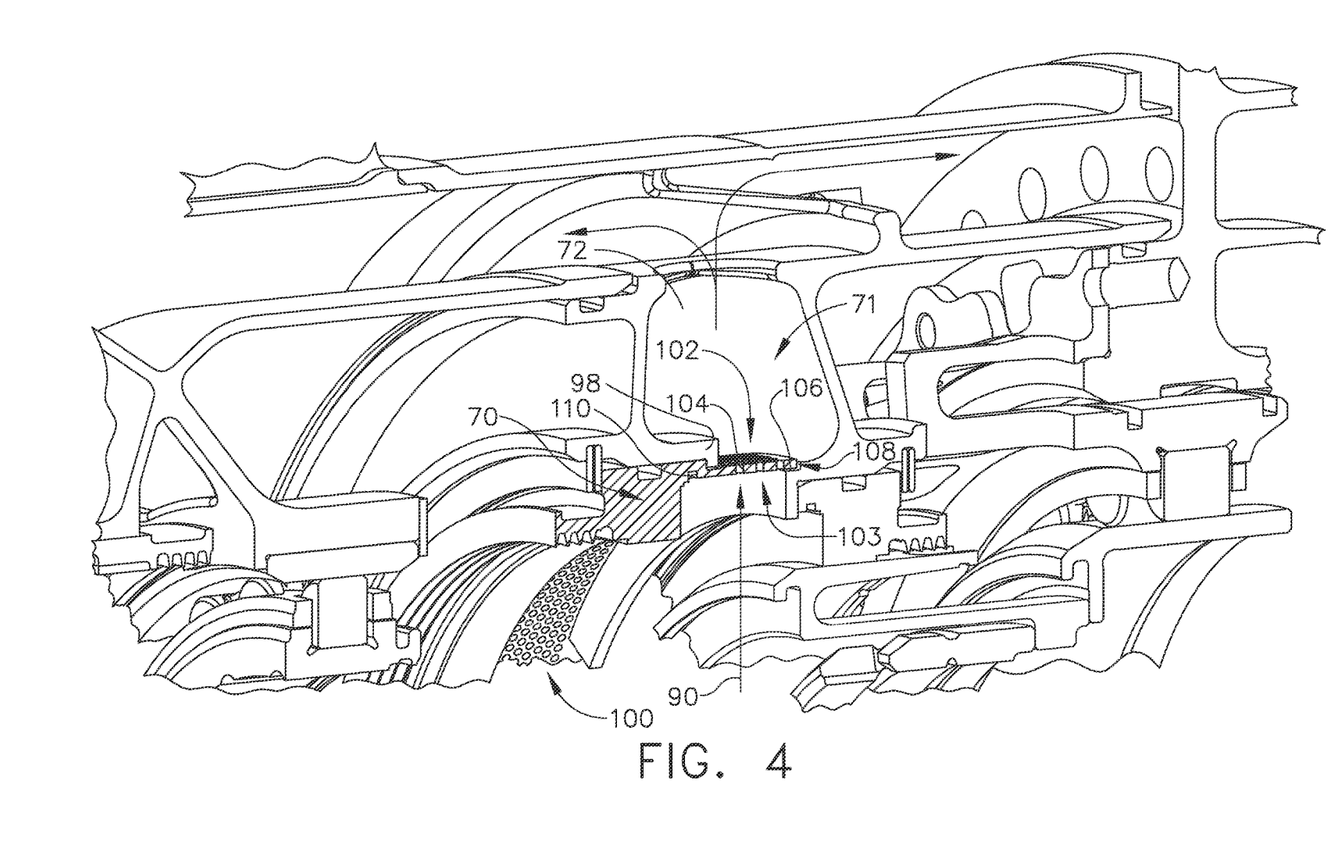
FIG. 4 is an isometric view of the exemplary flow vortex spoiler.

Referring now to FIG. 4, an isometric view of the vortex spoiler 100 is depicted. The vortex spoiler 100 is generally circular in shape and defined by surfaces 102, 103 having a plurality of apertures 104 therein. The circular cross-section may be formed by a single part or may be defined by multiple segments defining the circumference of the vortex spoiler 100. The vortex spoiler 100 includes a first edge 108 and a second edge 110. The first edge 108 is seated in a ledge 106 of a framed structure. The ledge 106 may be defined by a radially extending wall and an axially extending wall. According to the instant embodiment, the aft end of the vortex spoiler 100 is disposed in the ledge 106 and may be captured at the opposite second edge 110 or alternatively may be integrally connected to other structures as depicted, or both. For example, a finger 98 depends to engage the spoiler second edge 110 and limit axial movement of the vortex spoiler 100 and the seal 70 to which the spoiler is connected. Additionally, the aft sump seal 70 is connected to the vortex spoiler 100 according to instant embodiments, although this is not limiting and not necessary. The gaps between the aft first edge 108 and the adjacent parallel wall at ledge 106, and between the radially inward surface 103 and parallel surface of the ledge 106, are minimized to the greatest extent possible subject to assembly and other design considerations so as to restrict as much flow as possible from bypassing the spoiler apertures 104.

The apertures 104 each comprise an axis 112 (FIGS. 5, 6) which according to the instant embodiment, extends radially relative to the engine axis 26. However, according to some embodiments, the axis 112 may extend radially and/or may be at an angle to a purely radial direction. Additionally, according to some embodiments, while the depicted embodiment depicts a substantially linear first surface 102 between edges 110 and 108, the surface 102 may be defined by multiple linear segments which may be at angles to the axial direction of the engine or alternatively may be curvilinear between the first edge 108 and the second edge 110.

Figure 5:
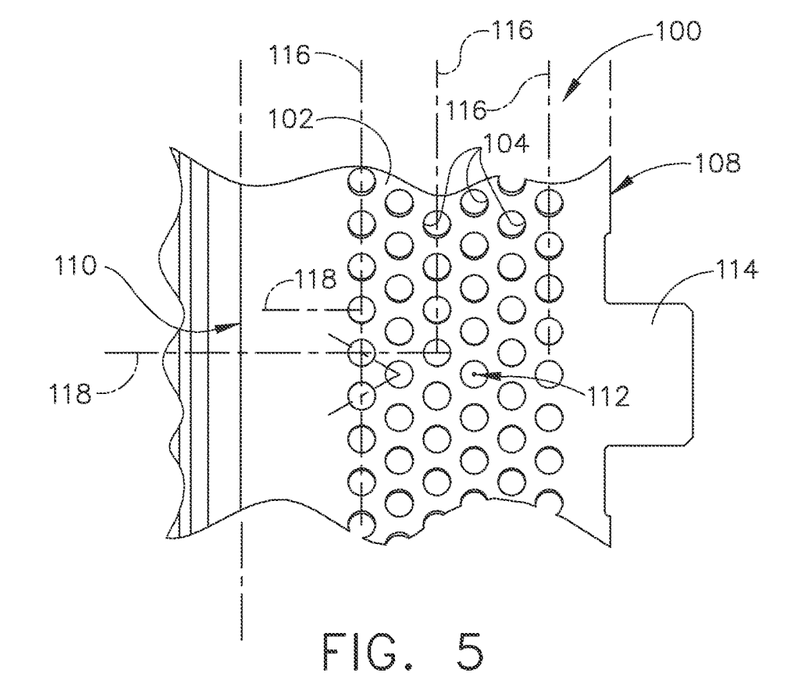
FIG. 5 is a top view of a portion of the flow vortex spoiler.

Referring now to FIG. 5, a top view of a portion of the screen or flow vortex spoiler 100 is depicted. The surface 102 includes the first edge 108 at the aft end and the second edge 110 at the axial end of the vortex spoiler 100. The vortex spoiler 100 further includes a plurality of apertures 104 disposed on the surface 102. The apertures 104 are arranged in a preselected pattern and closely spaced to allow a maximum number of apertures in the plate and provide a structure which does not significantly impede flow moving through the vortex spoiler 100 or result in excessive pressure loss at aft sump seal 70 (FIG. 2). According to the instant embodiments, the apertures 104 are arranged in a plurality of rows 118 and columns 116 wherein the apertures 104 are offset in the circumferential direction when moving in the axial direction. Alternatively, the apertures 104 may be arranged in various manners. The apertures 104 may be spaced apart between about 0 and 90 degrees from apertures of adjacent rows 118 and columns 116. The instant embodiment utilizes a 60 degree pattern, meaning the centers of the apertures are arranged at an angle of 60 degrees relative to adjacent apertures in adjacent rows 118 and columns 116. The term "row" is defined relative to the instant figure as horizontal or engine axial direction and the term "column" is defined as in the engine circumferential direction of the instant embodiment depicted. In other words, the apertures 104 are staggered or offset from one another moving in the axial direction at a specific circumferential location. The number and arrangement of apertures 104 may be tuned to provide the slight pressure differential between the seals 68, 70 (FIG. 2). The spacing of apertures 104 may be constant or may be random. The pattern described may also vary to other patterns or may be free of patterns. The goal of the vortex spoiler 100 and apertures 104 is that tangential component of the pressurization air flow 90 be reduced or eliminated from creating a large pressure drop across the vortex spoiler 100. One or more tabs 114 may be positioned along one or more edges in order to inhibit movement and/or rotation of the vortex spoiler 100 relative to adjacent components. However, other features may be utilized and the depicted embodiment should not be considered limiting.

Figure 6:
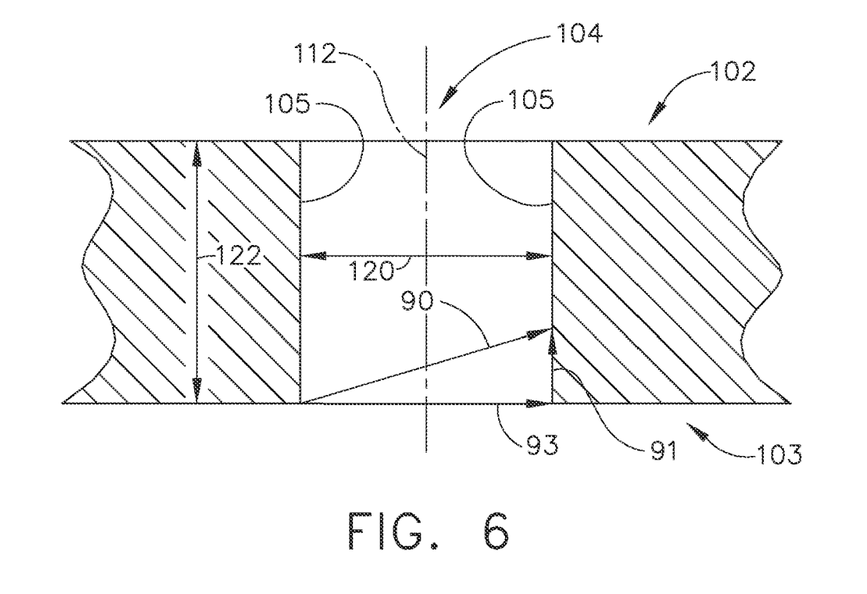
FIG. 6 is a length to diameter schematic diagram with the pressurization air shown with components.

Referring further to FIG. 5 and additionally to FIG. 6, a schematic view of an aperture 104 is depicted with an exemplary pressurization air flow 90 depicted and broken up by radial and tangential components. The depicted pressurization air represented by vector 90 is defined by a radial component 91 and a tangential component 93. The radial component 91 passes in a direction parallel to the length of the aperture 104 while the tangential component 93 extends in a direction perpendicular to the radial component 91. As a result, the tangential component 93 impinges upon the sidewall 105 of the aperture 104.

The depicted pressurization air flow 90 represents a vector 90 which corresponds to a low or idle engine speed. At a low or idle engine speed the radial component 91 is generally much less than the tangential component 93 of the overall air vector 90. Due to this situation, the pressurization air flow 90 cannot pass through aperture 104 without engaging the sidewall of the aperture 104. Accordingly, at this speed it is known that the tangential component 93 will be significantly reduced, if not substantially eliminated, by the vortex spoiler 100 and the plurality of apertures 104 depicted in FIG. 6. Upon passing through the vortex spoiler 100, the pressurization air flow 90 is almost solely radial in direction and free of vortex or swirl. The geometry of the aperture may vary from the 1:1 ratio described earlier of the length 122 to the diameter 120 of the aperture. It may be desirable in order to insure contact with the sidewall 105 that at a desired engine speed where swirl is problematic, that the vector 90 (FIG. 6) representing the pressurization air flow 90 cannot pass directly through the aperture 104 without impinging upon the sidewall 105.

The apertures 104 are shown having a circular shape in these views. The apertures 104 may alternatively have other shapes, for example polygon, oval, curvilinear, irregular non-specific or other shapes. Further, the aperture shapes may be the same or may vary over the vortex spoiler 100. Still further, the apertures 104 may be of the same size or vary. Still even further, the spacing may be consistent or may vary. As previously described, the vortex spoiler 100 should not substantially reduce flow but should reduce swirl of the pressurization air flow 90.

With reference additionally to FIG. 2, as the pressurization air flow 90 moves into the pressurization flow path 62 aft of the windage shield 60, the pressurization air flow 90 turns toward the pressurization tooth 64 and moves through the seal defined by pressurization tooth 64, into the lower pressure pathway 58. When the pressurization air flow 90 enters the lower pressure pathway 58, it experiences a drop in pressure due to the restriction created by the seal of pressurization tooth 64. Since the forward sump seal 68 functions as a seal for the oil sump 32, the pressurization air flow 90 on the forward side of the forward sump seal 68 inhibits the passage of oil from the aft side of the sump seal 68 to the forward side of forward sump seal 68.

As one skilled in the art will understand, the vortex spoiler 100 reduces substantially, and in large part eliminates, the tangential component 93 of the flow in the pressurization air flow 90. The tangential component 93 is reduced or eliminated at low speed conditions, where pressure differential causes oil seal leakage, by substantially eliminating swirl. In the present embodiment, the vortex spoiler 100 apertures 104 have a length 122 to diameter 120 ratio of 1 so that the pressurization air flow 90 cannot pass through any aperture 104 without the tangential component 93 causing the pressurization air flow 90 to contact the sidewall 105 of the aperture 104. The sidewall 105 redirects the tangential component 93 of the pressurization air flow 90 to a purely radial flow direction thereby eliminating swirl and reducing undesirable pressure rise of the pressurization air flow 90 in the downstream cavity. In other embodiments, the length 122 to diameter 120 ratio of the apertures may be selected based on actual tangential component 93 and radial component 91 of the pressurization air flow 90. Accordingly, the flow vortex spoiler 100 minimizes pressure differential across the oil sump 32 between the aft sump seal 70 and the forward sump seal 68. By inhibiting excessive pressure rise across the oil sump 32 of pressurization air flow 90, leakage is controlled at the aft sump seal 70. Additionally, by also inhibiting excessive pressure loss near pressurization flow path 72, oil leakage is also inhibited at the forward sump seal 68.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

What is claimed is:

1. A flow vortex spoiler for equalizing pressure between a first location and a second location, comprising:
    an oil sump wherein pressurization air flow moves about said oil sump through at least one sump pressurization cavity, said cavity having an inlet;
    a circumferential plate disposed at said inlet to said sump pressurization cavity;
    said circumferential plate having a plurality of closely spaced apart apertures;
    said pressurization air flow having a radial component and a tangential component with respect to the circumferential plate;
    said circumferential plate and said plurality of spaced apart apertures impinging said pressurization air flow and substantially reducing said tangential component of said pressurization air flow, wherein said vortex spoiler inhibits excessive pressure change within said pressurization cavity and inhibits oil leakage at forward and aft sump seals adjacent to said oil sump at said first location and said second location.

2. The flow vortex spoiler of claim 1, wherein said circumferential plate is fixed.

3. The flow vortex spoiler of claim 1, wherein said plurality of apertures each having a length to diameter ratio so as to substantially reduce said tangential component of pressurization air flow.

4. The flow vortex spoiler of claim 3 wherein said length to diameter ratio is based on said tangential component and said radial component of said pressurization air flow.

5. The flow vortex spoiler of claim 3, wherein said pressurization air flow impinges a sidewall of said apertures to reduce said tangential component and reduce vortexing of pressurization air.

6. The flow vortex spoiler of claim 1, wherein leakage of oil is reduced at said aft sump seal.

7. The flow vortex spoiler of claim 6, wherein pressure reversal at said aft sump seal is reduced due to reduction of said tangential component of said pressurization air flow.

8. The flow vortex spoiler of claim 1, wherein the tangential component of the pressurization air flow causes swirl of the pressurization air flow.

9. The flow vortex spoiler of claim 1, wherein the apertures each have a major axis.

10. The flow vortex spoiler of claim 9, wherein the major axis is purely radial.

11. The flow vortex spoiler of claim 9, wherein the major axis is at a non-perpendicular angle to an engine axis.

12. The flow vortex spoiler of claim 1, wherein said apertures define a plurality of rows and columns.

13. The flow vortex spoiler of claim 12, wherein apertures of a first column of the columns are offset in a circumferential direction from apertures of a second axially adjacent column.

14. The flow vortex spoiler of claim 13, wherein centers of said apertures in said first column are located between 0 and 90 degrees from apertures in said second column.

15. The flow vortex spoiler of claim 1, wherein said apertures have random spacing.

16. The flow vortex spoiler of claim 1, wherein said apertures have varying shapes.

17. The flow vortex spoiler of claim 1, wherein said apertures have constant shape.

18. The flow vortex spoiler of claim 1, wherein the circumferential plate further has at least one anti-rotation feature.

19. The flow vortex spoiler of claim 18, wherein the anti-rotation feature comprises a tab along an edge of said plate.

\* \* \* \* \*